United States Patent
Desai et al.

(10) Patent No.: US 10,459,916 B2
(45) Date of Patent: Oct. 29, 2019

(54) UPDATING DATABASE STATISTICS DURING QUERY EXECUTION

(71) Applicant: International Business Machines Corporation, Armonk, NY (US)

(72) Inventors: Samar T. Desai, Pune (IN); Dattatreya Govindappanavar, Hirekerur (IN); Mahadev Khapali, Bangalore (IN); Mohan Narayanswamy, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 742 days.

(21) Appl. No.: 14/814,736

(22) Filed: Jul. 31, 2015

(65) Prior Publication Data

US 2017/0031987 A1 Feb. 2, 2017

(51) Int. Cl.
*G06F 16/24* (2019.01)
*G06F 16/2453* (2019.01)

(52) U.S. Cl.
CPC .............................. *G06F 16/24542* (2019.01)

(58) Field of Classification Search
USPC ........................................................ 707/718
See application file for complete search history.

(56) References Cited

U.S. PATENT DOCUMENTS

| 6,366,901 | B1 | 4/2002 | Ellis |
| 6,529,901 | B1 | 3/2003 | Chaudhuri et al. |
| 7,412,439 | B2 | 8/2008 | Bossman et al. |
| 7,831,592 | B2 | 11/2010 | Markl et al. |
| 2007/0208695 | A1* | 9/2007 | Burger ............ G06F 17/30483 |
| 2008/0288446 | A1* | 11/2008 | Hu .................... G06F 17/30536 |
| 2009/0037367 | A1* | 2/2009 | Wein .................... G06F 9/5061 |
| 2012/0197868 | A1 | 8/2012 | Fauser et al. |
| 2014/0095475 | A1 | 4/2014 | Su et al. |

(Continued)

OTHER PUBLICATIONS

Comeau et al., "Efficient Collection of Table Statistics," IBM Technical Disclosure Bulletin, Aug. 1991, p. 170, vol. 34, No. 3, IP.com No. 000121263, IBM Corp.

(Continued)

*Primary Examiner* — Sherief Badawi
*Assistant Examiner* — Raheem Hoffler
(74) *Attorney, Agent, or Firm* — Dmitry Paskalov (57) ABSTRACT

A method for updating a plurality of database statistics during a query execution is provided. The method may include receiving a compiled query. The method may also include determining if the received compiled query requires at least one table scan operation on a full table to resolve the received compiled query. The method may further include determining if a plurality of table statistics associated with the full table has not been updated within a pre-defined time-period, whereby the determining is based on the determination that the received compiled query requires at least one table scan operation on the full table to resolve the received compiled query. The method may additionally include collecting a plurality of statistics associated with the full table based on the determination that the plurality of table statistics associated with the full table has not been updated within the pre-defined time-period.

15 Claims, 5 Drawing Sheets

(56) References Cited

U.S. PATENT DOCUMENTS

| | | | | |
|---|---|---|---|---|
| 2014/0365533 | A1* | 12/2014 | Debray | G06F 17/30474 |
| | | | | 707/803 |
| 2015/0254303 | A1* | 9/2015 | Saadat | G06F 17/30321 |
| | | | | 707/716 |
| 2016/0306810 | A1* | 10/2016 | Ni | G06F 16/182 |
| 2016/0350371 | A1* | 12/2016 | Das | G06F 17/30463 |

OTHER PUBLICATIONS

Mell et al., "The NIST Definition of Cloud Computing," National Institute of Standards and Technology, Sep. 2011, p. 1-3, Special Publication 800-145.

Alapati et al., "Configuring the Optimizer," Oracle Database 12c Performance Tuning Recipes: A Problem-Solution Approach, 2013, 53 Pages, Chapter 13, Apress.

Fritchey, "SQL Server Statistics Questions We Were Too Shy to Ask," Red Gate Simple Talk, Feb. 12, 2013, p. 1-16, Red Gate Software Ltd., https://www.red-gate.com/simple-talk/sql/performance/sql-server-statistics-questions-we-were-too-shy-to-ask/, Accessed on Apr. 4, 2018.

Oracle, "Optimizer Statistics Concepts," Database SQL Tuning Guide, p. 1-28, Oracle Database Online Documentation 12c Release 1 (12.1), https://docs.oracle.com/database/121/TGSQL/tgsql_statscon.htm#TGSQL336, Accessed on Apr. 4, 2018.

* cited by examiner

UPDATING DATABASE STATISTICS DURING QUERY EXECUTION

BACKGROUND

The present invention relates generally to the field of computers, and more particularly to database statistics.

Query optimization is a function of many relational database management systems. The query optimizer attempts to determine the most efficient way to execute a given query by considering the possible query plans. A query is a request for information from a database and generally, the query optimizer cannot be accessed directly by users. Once queries are submitted to database server, and parsed by the parser, they are then passed to the query optimizer where optimization occurs. Optimizers in a database system rely on database statistics, such as the number of rows in a table or the number of distinct values in a column to choose or form the best query execution plan to retrieve data needed to run the query.

SUMMARY

According to one embodiment, a method for updating a plurality of database statistics during a query execution is provided. The method may include receiving a compiled query. The method may also include determining if the received compiled query requires at least one table scan operation on a full table to resolve the received compiled query. The method may further include determining if a plurality of table statistics associated with the full table has not been updated within a pre-defined time-period, whereby the determining is based on the determination that the received compiled query requires at least one table scan operation on the full table to resolve the received compiled query. The method may additionally include collecting a plurality of statistics associated with the full table based on the determination that the plurality of table statistics associated with the full table has not been updated within the pre-defined time-period.

According to another embodiment, a computer system for updating a plurality of database statistics during a query execution is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a compiled query. The method may also include determining if the received compiled query requires at least one table scan operation on a full table to resolve the received compiled query. The method may further include determining if a plurality of table statistics associated with the full table has not been updated within a pre-defined time-period, whereby the determining is based on the determination that the received compiled query requires at least one table scan operation on the full table to resolve the received compiled query. The method may additionally include collecting a plurality of statistics associated with the full table based on the determination that the plurality of table statistics associated with the full table has not been updated within the pre-defined time-period.

According to yet another embodiment, a computer program product for updating a plurality of database statistics during a query execution is provided. The computer program product may include one or more computer-readable storage devices and program instructions stored on at least one of the one or more tangible storage devices, the program instructions executable by a processor. The computer program product may include program instructions to receive a compiled query. The computer program product may also include program instructions to determine if the received compiled query requires at least one table scan operation on a full table to resolve the received compiled query. The computer program product may further include program instructions to determine if a plurality of table statistics associated with the full table has not been updated within a pre-defined time-period, whereby the determining is based on the determination that the received compiled query requires at least one table scan operation on the full table to resolve the received compiled query. The computer program product may additionally include program instructions to collect a plurality of statistics associated with the full table based on the determination that the plurality of table statistics associated with the full table has not been updated within the pre-defined time-period.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to database statistics. The following described exemplary embodiments provide a system, method and program product to, among other things, update database statistics during query execution. Therefore, the present embodiment has the capacity to improve the technical field of database statistics by taking advantage of data that is already present in the buffer pool and therefore, saving the time required for disk input/output (I/O). More specifically, the present embodiment is related to upgrading from statistics that were collected using a sampling of rows to statistics collected using the whole table. As such, the present embodiment provides the capability to update the table statistics when a user query is being resolved, which uses the full table scan and therefore, may reduce the I/O cost involved in collecting stats, which is the major cost for collecting statistics. Additionally, the statistics collected will be for the whole table instead of from a sampling of rows. Thus, the collected statistics are more accurate. Furthermore, since the statistics are on the whole table, the optimizer may choose or form better plans and therefore, improve query performance. Also, customers may use off-line maintenance of the table, if the purpose was mainly for updating the statistics.

As previously described, optimizers in a database system rely on database statistics, such as the number of rows in a table or the number of distinct values in a column to choose or form the best query execution plan to retrieve data needed to run the query. However, these statistics, which are stored in the database, may be stale (or no longer valid) over a period of time, if not updated regularly. As such, using these values may result in poor execution plan, and in turn, may degrade the query performance. Therefore there is a need for maintaining statistics representing the most recent state of the table. For example, the optimizer will have better performance, if the statistics collected were on the full table.

Currently, either the user or the database administrator has to manually run a command, such as runstats in the case of DB2 which would collect statistics about the table and update the statistics. Another way is to configure automatic maintenance of a table, which will update the statistics when certain configured criterion is met. However, in both of these cases, depending on how frequently these commands or tools are executed, the table would have stale statistics. Furthermore, these statistics collection operations are both input/output (I/O) and CPU intensive, which would require scanning the entire table. Therefore, to reduce the cost of the I/O, statistics may be collected on sample of rows instead of all the rows in the table.

Typically, the database system will be running many operations while executing user queries and send the result back to the user. In many cases, while trying to execute these queries, the database system needs to execute in an optimal way so as to improve query performance and send the result back to the user in a very short period of time. To choose or form the best query execution plan, the optimizer in a database system would rely totally on the database statistics. However, if the database statistics are not updated regularly or if it contains stale values, it may result in bad execution plans in turn resulting in poor performance. As such, it may be advantageous, among other things, to provide the capability to update database statistics during query execution.

According to at least one implementation, the present embodiment may be utilized during a query execution, when a full table scan is required to execute a query. As such, when a full table scan is performed, all the pages for that particular table will be in memory. When such queries are detected, the present embodiment, may automatically run the statistics collection on that whole table in the background. Such an implementation may assist in maintaining fresh statistics related to that table. As such, the collected statistics may be more accurate since the statistics collected are not collected just through a sampling of rows, but are collected through all of the rows in the table.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for the auto collection of database statistics during a full table scan. As such, the present embodiment may provide the capability for updating database statistics during query execution. According to at least one implementation, the present embodiment has the capacity to improve query performance by helping in maintaining a database with fresh and valid statistics. Additionally, the present embodiment may also reduce the I/O costs involved in running the statistics collection tools or commands during the statistics collection process. An example implementation may be as follows:

Consider the following query—
select *
from
   db2inst1.t1,
   db2inst1.t2,
where
   t1.x=t2.x The query access plan for this particular query will typically look like the following if no indexes or views are created to better server this query.

```
                TBSCAN
                  |
                TABLE: DB2INST1
                T2
```

```
                          NLJOIN
           /---------------+---------------\
         TBSCAN
           |
        TABLE: DB2INST1
           T1
```

The example query above illustrates a query where there is no sufficient index or other information available to optimize the query. When such a query is executed, it would result in performing a full table scan. Then, when the full table scan is done, all of the pages for that particular table are placed in the memory. According to at least one implementation of the present embodiment, when such queries are detected, the present embodiment may run a background runstats on that whole table to update the statistics. As a result, such an implementation may reduce the IO cost, which is the major cost involved in running the runstats on whole database/table. Additionally, such an implementation may assist in improving the query performance since the present embodiment may provide more accurate statistics and the optimizer may be able to use this data and estimate correctly during plan generation.

Figure 1:
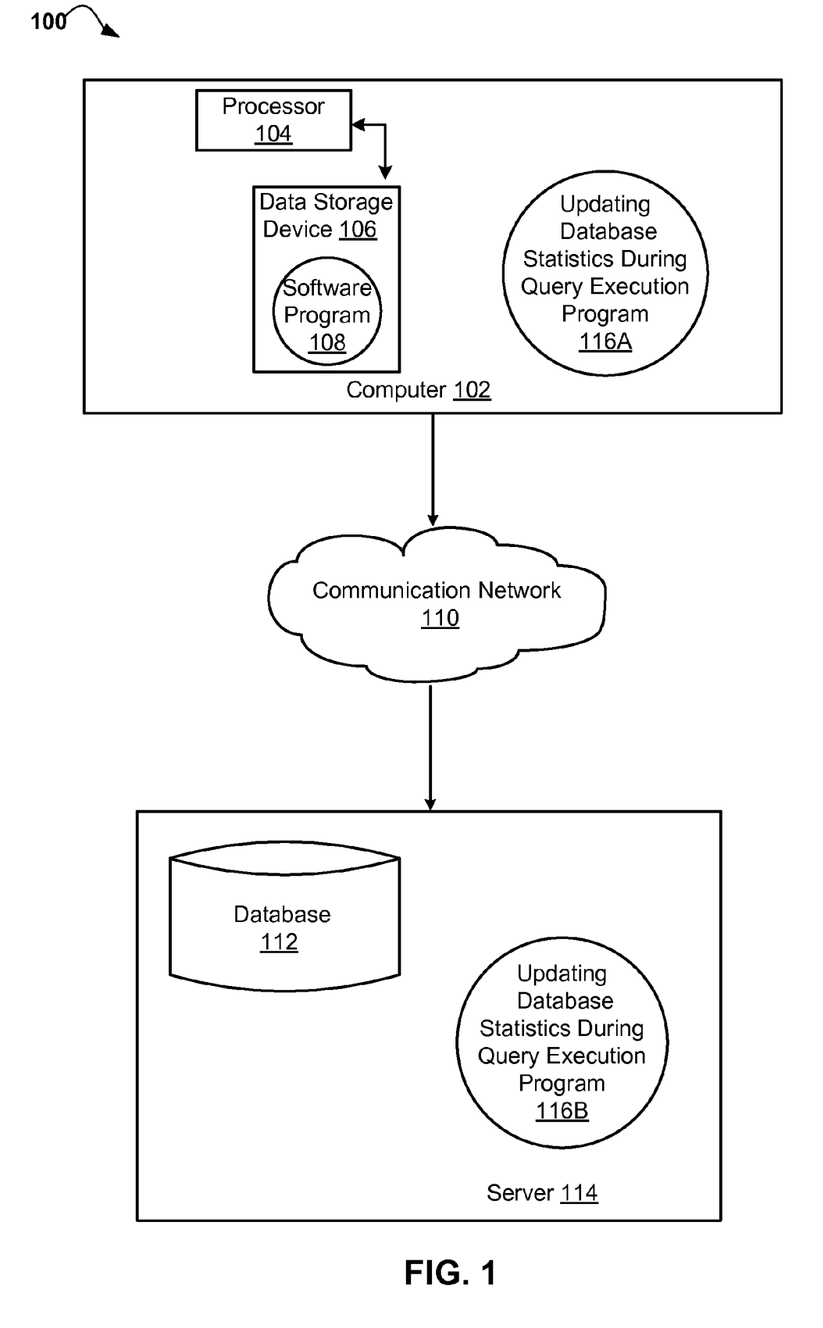
FIG. 1 illustrates a networked computer environment according to at least one embodiment.

Referring to FIG. 1, an exemplary networked computer environment 100 in accordance with one embodiment is depicted. The networked computer environment 100 may include a computer 102, a processor 104, and a data storage device 106 that is enabled to run a software program 108 and an Updating Database Statistics During Query Execution Program 116A. The networked computer environment 100 may also include a server 114 that is enabled to run an Updating Database Statistics During Query Execution Program 116B that may interact with a database 112 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Updating Database Statistics During Query Execution Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Updating Database Statistics During Query Execution Program 116A, 116B may interact with a database 112 that may be embedded in various storage devices, such as, but not limited to a computer 102, a networked server 114, or a cloud storage service.

As previously described, the client computer 102 may access the Updating Database Statistics During Query Execution Program 116B, running on server computer 114 via the communications network 110. For example the Updating Database Statistics During Query Execution Program 116A, 116B running on a client computer 102 may be utilized for updating database statistics during query execution. According to at least one implementation, and as previously described, the present embodiment has the capacity to improve query performance by assisting in maintaining a database with fresh and valid statistics. Additionally, the present embodiment may also reduce the I/O costs involved in running the statistics collection tools or commands during the statistics collection process. The Updating Database Statistics During Query Execution method is explained in more detail below with respect to FIG. 2.

Figure 2:
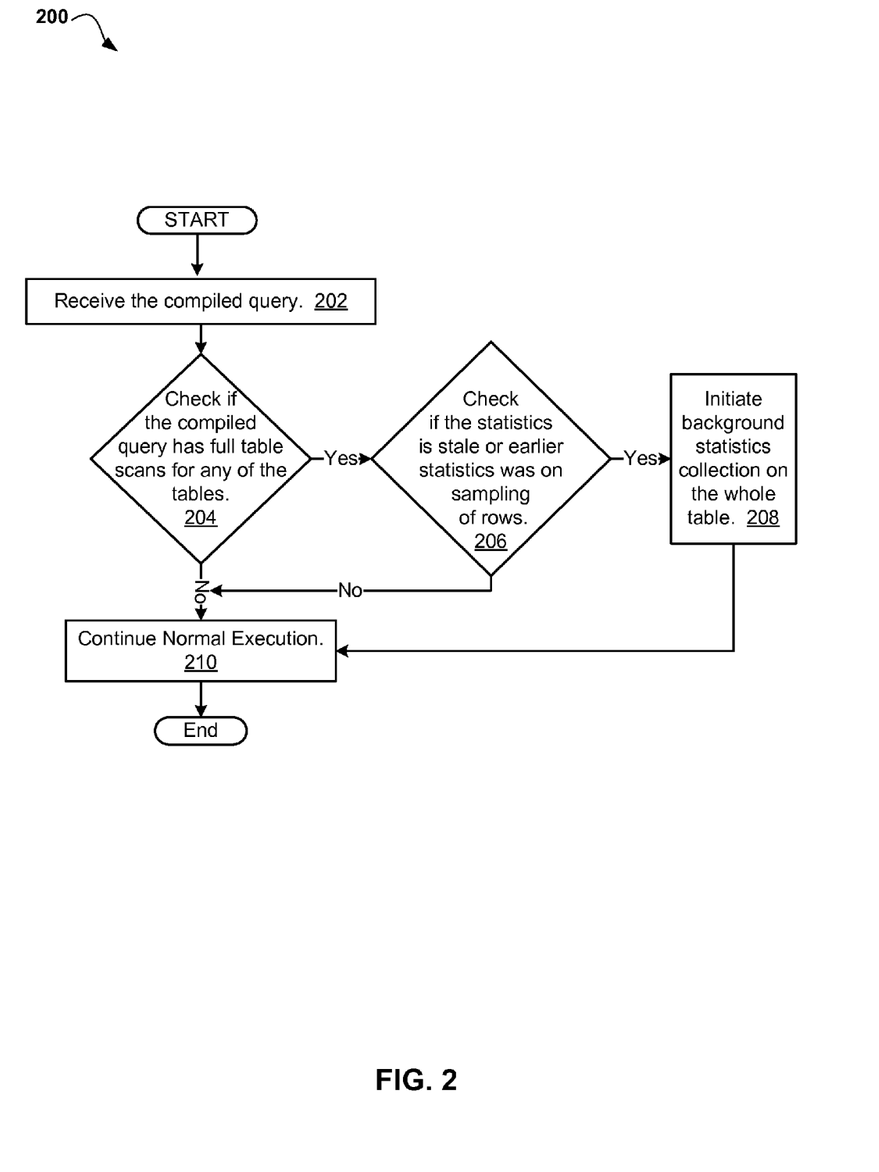
FIG. 2 is an operational flowchart illustrating the steps carried out by a program that that updates database statistics during query execution according to at least one embodiment.

Referring now to FIG. 2, an operational flowchart 200 illustrating the steps carried out by a program that updates database statistics during query execution. As previously described, the Updating Database Statistics During Query Execution Program 116A, 116B (FIG. 1) may detect that an executed query requires a full table scan to be performed. Then, based on that detection, the present embodiment will run a background runstats on that whole table to update the statistics while the all of the pages for that particular table are placed in the memory. As such, whenever is query is being executed by the database, the following operations, with respect to the steps in FIG. 2, will be performed to update the statistics:

At 202, the compiled query is received. As such, the compiled query or the execution plan of the query is received by the Updating Database Statistics During Query Execution Program 116A, 116B (FIG. 1) in order to determine whether the executed query requires a full table scan to be performed.

Then at 204, it is determined whether the compiled query has full table scans for any of the tables. Therefore, the Updating Database Statistics During Query Execution Program 116A, 116B (FIG. 1) checks if the new query requires any table scan operation to resolve the query.

If at 204, it is determined that the compiled query does not have full table scans for any of the tables, then the method continues to step 210 to continue normal execution of the query. However, if at 204, it is determined that the compiled query does require full table scans for any of the tables (i.e., determines there is a need to perform a table scan operation on a table/s), then the method continues to step 206, to determine if the statistics are stale or if the earlier statistics were on a sampling of rows. As such, the Updating Database Statistics During Query Execution Program 116A, 116B (FIG. 1), checks if the statistics on that table/s have been updated recently (i.e., within a pre-determined time period, a pre-defined time period, or a threshold period). If it is determined at 206 that the statistics are not stale or earlier statistics collected were not on a sampling of rows, then the method continues to step 210 to continue normal execution of the query.

However, if it is determined at 206 that the statistics are stale or earlier statistics collected were on a sampling of rows, then the method continues to step 208 to initiate a background statistics collection on the whole table. Therefore, the Updating Database Statistics During Query Execution Program 116A, 116B (FIG. 1) initiates a background statistics collection on the whole table, which would use the data in the bufferpool populated by the user query.

Next at 210, the Updating Database Statistics During Query Execution Program 116A, 116B (FIG. 1) continues normal execution of the query. Therefore, if it was determined that the statistics were on a full table, the statistics are valid, and the statistics are fresh, then the method continues normal execution of the query.

It may be appreciated that FIG. 2 provides only an illustration of one implementation and does not imply any limitations with regard to how different embodiments may be implemented. Many modifications to the depicted environments may be made based on design and implementation requirements. As previously mentioned, the present embodiment provides a method for optimizing the process of updating or collecting database statistics. More specifically, the present embodiment may identify opportunities (such as a query requiring a table scan) for collecting database statistics while avoiding dedicated table scanning for collecting database statistics.

The present embodiment focuses on workload queries that result in a full table scan (i.e., pull all data pages of the table into buffer pools). According to at least one implementation, the full table scan is leveraged to initiate a statistical collection daemon in the background to maintain up-to-date statistics. As a result, statistics may be updated with minimal cost.

Although a create index may collect full statistics and a workload may be run with insert/update/delete operations on millions of rows later, such a method may potentially make the statistics stale. However, according to at least one implementation of the present embodiment, if there is DML/SQL statement which is resulting in the FULL table scan and requires to pull all the datapages to the bufferpool, the present embodiment may leverage the cost incurred in pulling these datapages by updating table statistics instead of waiting for the regularly-scheduled maintenance windows. With this, queries that run after the statistics are updated will have better optimizer plans, and hence, better response time.

The following are example scenarios that will lead to full table scan in a typical relational database architecture:

1. A full table scan takes place usually when the column or group of columns of a table needed for the scan do NOT contain an index which can be used for the purpose.
2. A full table scan happens when the statistics are not updated. Normally, statistics are kept on tables and indexes. However, if for some reason table or index statistics have not been updated, then this may result in a full table scan.
3. A full table scan results when the existing index becomes invalid. Indexes can become invalid or unusable whenever a DBA tasks shifts the ROWID values, thereby requiring an index rebuild. These DBA tasks that shift table ROWID's include: Table partition maintenance—Alter commands (move, split, or truncate partition) which will shift ROWID's, making the index invalid and unusable, until the index is rebuilt it results in full table scan.

Significantly, according to the present embodiment, the table statistics may be updated by leveraging the full table scan that was resulted by a user query.

Figure 3:
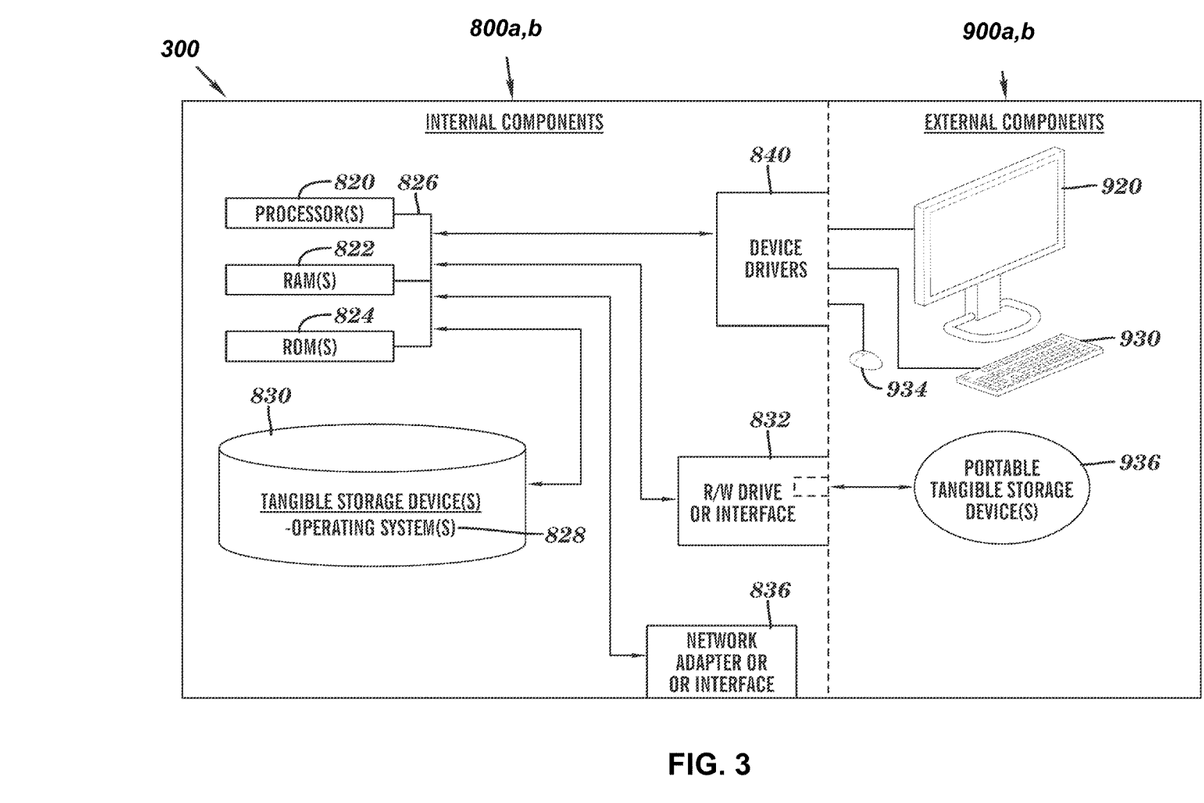
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 *a,b* and external components 900 *a,b* illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Updating Database Statistics During Query Execution Program 116A (FIG. 1) in client computer 102 (FIG. 1) and the Updating Database Statistics During Query Execution Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Updating Database Statistics During Query Execution Program 116A, 116B (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Updating Database Statistics During Query Execution Program 116A (FIG. 1) in client computer 102 (FIG. 1) and the Updating Database Statistics During Query Execution Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Updating Database Statistics During Query Execution Program 116A (FIG. 1) in client computer 102 (FIG. 1) and the Updating Database Statistics During Query Execution Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
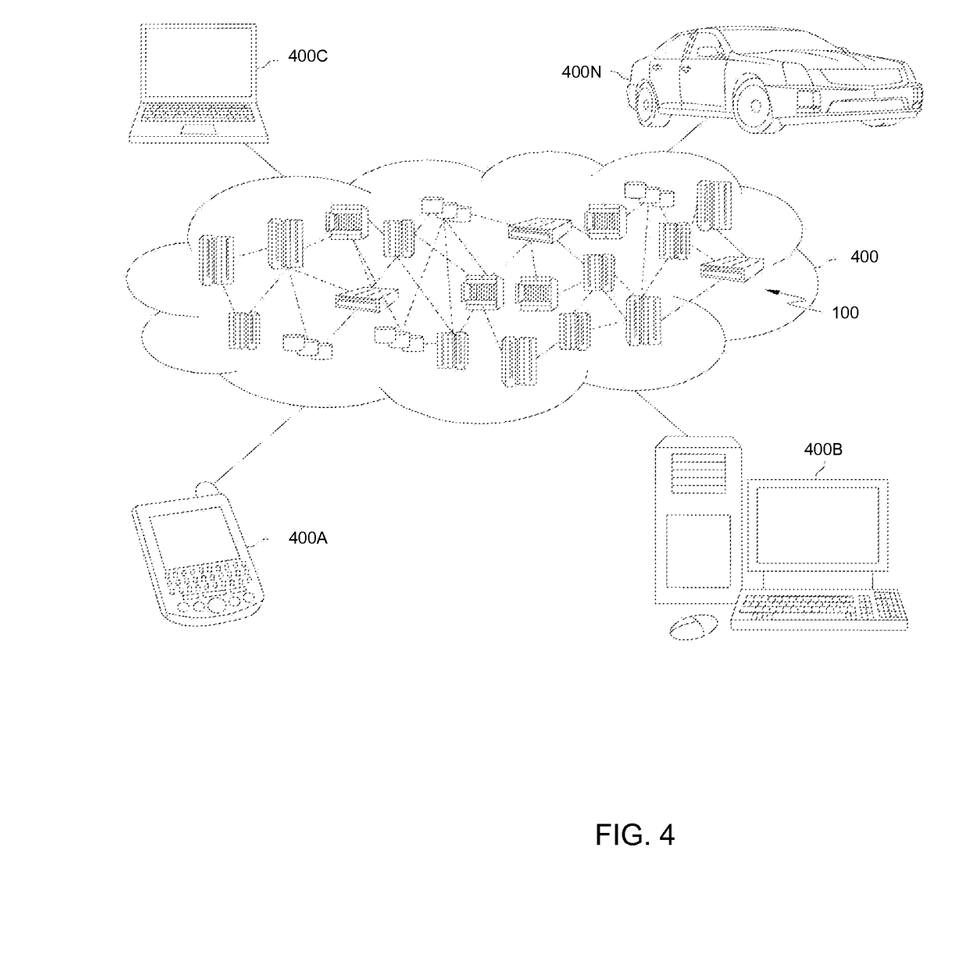
FIG. 4 is a block diagram of an illustrative cloud computing environment including the computer system depicted in FIG. 1, according to at least one embodiment.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
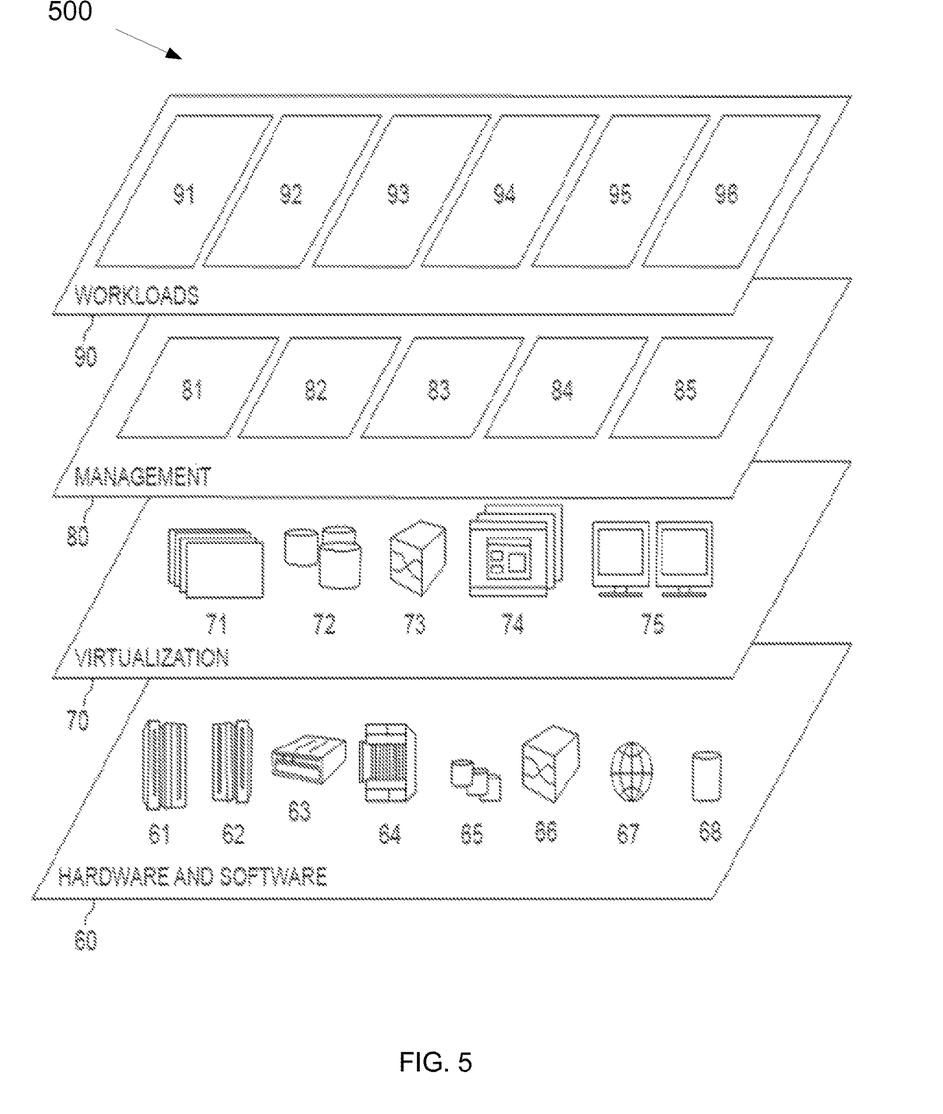
FIG. 5 is a block diagram of functional layers of the illustrative cloud computing environment of FIG. 4, according to at least one embodiment.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Updating Database Statistics During Query Execution 96. An Updating Database Statistics During Query Execution Program 116A, 116B (FIG. 1) may provide the capability for updating database statistics during query execution.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for improving query performance of an optimizer in a database system by auto collection and updating a plurality of database statistics in a background during a query execution, the method comprising:

receiving, by the database system, a compiled query;

based on determining that the received compiled query requires at least one table scan operation on a full table to resolve the received compiled query, wherein the full table is associated with an invalid index and wherein the required at least one table scan stores each data page associated with the full table in a plurality of buffer pools and based on determining that a plurality of table statistics associated with the full table has not been updated within a pre-defined time-period, wherein the determining is based on the determination that the received compiled query requires at least one table scan operation on the full table to resolve the received compiled query and each data page associated with the full table has been stored in the plurality of buffer pools;

collecting and updating a plurality of statistics associated with the full table, on a sample of rows instead of all the rows in the full table in the background, during execution of the compiled query, based on the determination that the plurality of table statistics associated with the full table has not been updated within the pre-defined time-period, wherein the plurality of statistics is collected on each row of the full table during the required at least one table scan while each data page associated with the full table is stored in the plurality of buffer pools and wherein the plurality of statistics is collected prior to the invalid index being rebuilt, and wherein updating the collected plurality of statistics associated with the full table comprises leveraging a full table scan that was resulted by a user query.

2. The method of claim 1, wherein the compiled query includes an execution plan of the query.

3. The method of claim 1, wherein the determining that the plurality of table statistics associated with the full table has not been updated within the pre-defined time-period comprises determining whether the plurality of table statistics is stale or when an earlier plurality of statistics was collected on a sampling of rows for the full table.

4. The method of claim 1, wherein collecting the plurality of statistics associated with the full table comprises initiating a collection of a plurality of background statistics on the entire full table.

5. The method of claim 4, wherein initiating the collection of the plurality of background statistics on the entire full table comprises collecting the plurality of statistics through all of the rows in the full table.

6. A computer system for improving query performance of an optimizer in a database system by auto collection and updating a plurality of database statistics in a background during a query execution, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, by the database system, a compiled query;

based on determining that the received compiled query requires at least one table scan operation on a full table to resolve the received compiled query, wherein the full table is associated with an invalid index and wherein the required at least one table scan stores each data page associated with the full table in a plurality of buffer pools and based on determining that a plurality of table statistics associated with the full table has not been updated within a pre-defined time-period, wherein the determining is based on the determination that the received compiled query requires at least one table scan operation on the full table to resolve the received compiled query and each data page associated with the full table has been stored in the plurality of buffer pools collecting and updating a plurality of statistics associated with the full table, on a sample of rows instead of all the rows in the full table in the background, during execution of the compiled query, based on the determination that the plurality of table statistics associated with the full table has not been updated within the pre-defined time-period, wherein the plurality of statistics is collected on each row of the full table during the required at least one table scan while each data page associated with the full table is stored in the plurality of buffer pools and wherein the plurality of statistics is collected prior to the invalid index being rebuilt, and wherein updating the collected plurality of statistics associated with the full table comprises leveraging a full table scan that was resulted by a user query.

7. The computer system of claim 6, wherein the compiled query includes an execution plan of the query.

8. The computer system of claim 6, wherein the determining that the plurality of table statistics associated with the full table has not been updated within the pre-defined time-period comprises determining whether the plurality of table statistics is stale or when an earlier plurality of statistics was collected on a sampling of rows for the full table.

9. The computer system of claim 6, wherein collecting the plurality of statistics associated with the full table comprises initiating a collection of a plurality of background statistics on the entire full table.

10. The computer system of claim 9, wherein initiating the collection of the plurality of background statistics on the entire full table comprises collecting the plurality of statistics through all of the rows in the full table.

11. A computer program product for improving query performance of an optimizer in a database system by auto collection and updating a plurality of database statistics in a background during a query execution, the computer program product comprising:
   one or more computer-readable storage devices and program instructions stored on at least one of the one or more tangible storage devices, the program instructions executable by a processor, the program instructions comprising:
   program instructions to receive a compiled query;
   based on determining that the received compiled query requires at least one table scan operation on a full table to resolve the received compiled query, wherein the full table is associated with an invalid index and wherein the required at least one table scan stores each data page associated with the full table in a plurality of buffer pools and based on
   determining that a plurality of table statistics associated with the full table has not been updated within a pre-defined time-period, wherein the determining is based on the determination that the received compiled query requires at least one table scan operation on the full table to resolve the received compiled query and each data page associated with the full table has been stored in the plurality of buffer pools
   program instructions to collect and update a plurality of statistics associated with the full table, on a sample of rows instead of all the rows in the full table in the background, during execution of the compiled query, based on the determination that the plurality of table statistics associated with the full table has not been updated within the pre-defined time-period, wherein the plurality of statistics is collected on each row of the full table during the required at least one table scan while each data page associated with the full table is stored in the plurality of buffer pools and wherein the plurality of statistics is collected prior to the invalid index being rebuilt, and wherein program instructions to update the collected plurality of statistics associated with the full table comprises leveraging a full table scan that was resulted by a user query.

12. The computer program product of claim 11, wherein the compiled query includes an execution plan of the query.

13. The computer program product of claim 11, wherein the determining that the plurality of table statistics associated with the full table has not been updated within the pre-defined time-period comprises determining whether the plurality of table statistics is stale or when an earlier plurality of statistics was collected on a sampling of rows for the full table.

14. The computer program product of claim 11, wherein collecting the plurality of statistics associated with the full table comprises initiating a collection of a plurality of background statistics on the entire full table.

15. The computer program product of claim 14, wherein initiating the collection of the plurality of background statistics on the entire full table comprises collecting the plurality of statistics through all of the rows in the full table.

* * * * *